March 24, 1964 A. J. WASLEY 3,125,914
METHOD AND APPARATUS FOR TRIMMING BEARING SEALS
Filed Oct. 30, 1957 2 Sheets-Sheet 1
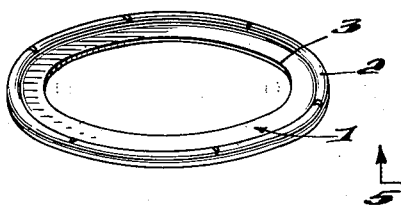
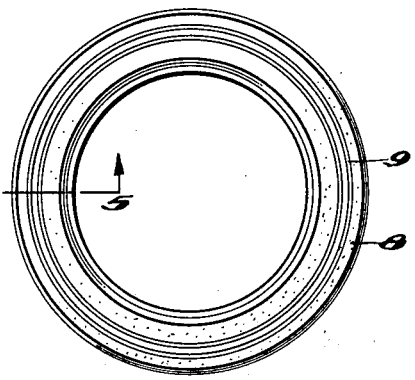
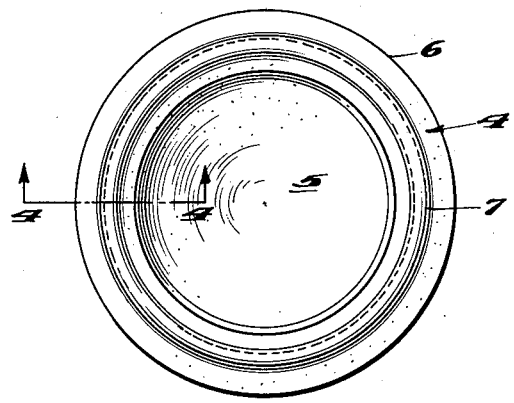
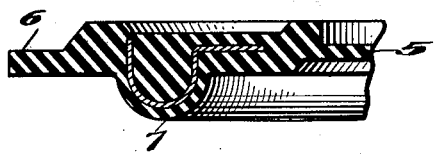
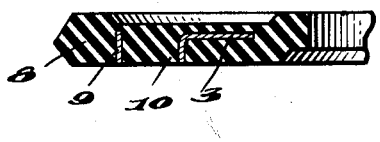
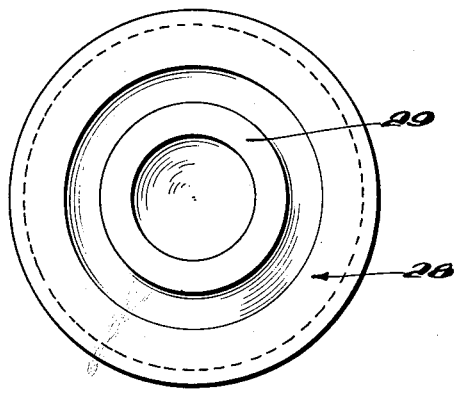
INVENTOR
ARTHUR J. WASLEY,
BY Lawson and Taylor
ATTORNEYS March 24, 1964 A. J. WASLEY 3,125,914
METHOD AND APPARATUS FOR TRIMMING BEARING SEALS
Filed Oct. 30, 1957 2 Sheets-Sheet 2

INVENTOR
ARTHUR J. WASLEY,

BY Lawson and Taylor

ATTORNEYS

United States Patent Office 3,125,914
Patented Mar. 24, 1964

3,125,914
METHOD AND APPARATUS FOR TRIMMING
BEARING SEALS
Arthur J. Wasley, Bristol, Conn., assignor to Wasley
Products, Incorporated, Plainville, Conn., a corporation of Connecticut
Filed Oct. 30, 1957, Ser. No. 693,408
1 Claim. (Cl. 82—47)

This invention relates to a method and apparatus for trimming bearing seals to their finished form from the rough molding. More particularly the invention provides a process and means for cutting from the reinforced rubber seal all of the excess material from the peripheral edges and the faces thereof.

It is well known in the art to make bearing seals by molding the resilient material and trimming the molding to the final form. Ordinarily, the bearing seal is provided with a metallic portion which is embedded within the resilient material to provide reinforcement. It is customary to mold such bearing seals in the form of discs and in a subseqeunt operation trim the outer peripheral edge and cut the inner section of the disc out to form the finished ring-shaped bearing seal. This latter operation is difficult to perform with any degree of precision due to the lack of any means to positively locate the disc irrespective of the amount of excess rubber extending around the outer periphery. It can be readily appreciated that in order to manufacture these bearing seals in large quantities it is necessary to provide means for locating the bearing seals for trimming purposes.

A further difficulty occurs in connection with the formation of one particular type of bearing seal in which the metallic insert is initially provided with a loop portion which is removed in the trimming operation. The removal of the loop portion without in any way affecting the surface of the finished bearing seal has constituted a principal difficulty. It has been found that when the loop portion is removed by ordinary cutting procedures, metallic burrs remain on the bearing surface rendering it unsuitable for its intended use.

The present invention provides a method and apparatus for avoiding all of the foregoing difficulties and for providing means for expeditiously trimming bearing seals. This is achieved generally by the use of a locating boss on the rough molding which boss serves to locate the molding in the cutting knives. The seal is then clamped and the rotating cutting dies remove the excess resilient material from the outer periphery of the molding and remove the center portion of the disc to form the final ring-shaped seal.

In connection with the bearing seal having a metallic loop portion to be removed, the seal is grasped between a pair of plates, in the present invention, and the plates are rotated and moved axially so that the metallic loop portion engages the cutter. The cutter is reciprocated longitudinally across the surface of the seal to remove all burrs and irregularities in the surface of the seal.

A primary object of the present invention is to provide an improved method and apparatus for trimming bearing seals.

Another object of the present invention is to provide a method and apparatus for removing the excess resilient material from the outer peripheral edge of the bearing seal and for removing the central portion of the rough molding disc.

Another object of the present invention is to provide a process and apparatus for removing portions of a metallic reinforcement for a bearing seal without the formation of burrs.

Other objects and many of the attendant advantages of the present invention will become apparent upon consideration of the following detailed specification taken in connection with the accompanying drawings wherein:

FIG. 1 is a perspective view of a metallic reinforcement member for one form of a bearing seal;

FIG. 2 is a plan view of the rough molding of a bearing seal with the metallic insert of FIG. 1;

FIG. 3 is a plan view of the completed bearing seal shown in FIG. 2;

FIG. 4 is a cross-sectional view of the rough molding along the lines 4—4 of FIG. 2;

FIG. 5 is a cross-section of the completed bearing seal along the line 5—5 of FIG. 3;

FIG. 6 is a plan view of another type of bearing seal;

Figure 7:
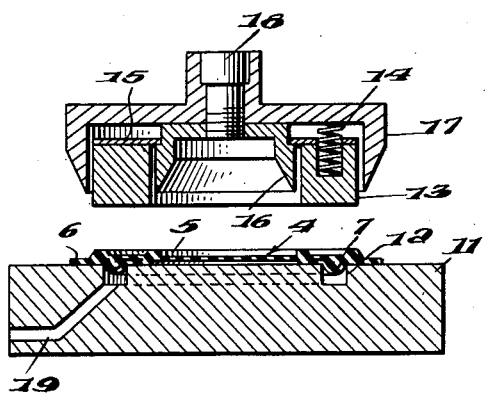
FIG. 7 is a vertical sectional view of a machine for trimming the bearing seal shown in FIG. 2.

Referring now more particularly to the drawings wherein like numerals indicate like parts throughout the several views, there is shown at 1 in FIG. 1 a metallic insert which is provided with a loop portion 2 and an inwardly extending flange 3. This metallic member is placed within the bearing seal mold and is embedded within the resilient material so that a molding such as shown at 4 in FIG. 2 is formed. As can be seen in FIG. 2, this molding is of disc-shape and is provided with a relatively thin central portion 5 and a thin peripheral edge portion 6 which are to be trimmed off the molding to form the finished bearing seal. Additionally, as is seen in FIG. 2, the molding has a bead portion 7 which corresponds to the loop portion of the metallic insert which is embedded in the resilient material.

A cross-sectional view of the rough molding is shown in FIG. 4. The peripheral edge portion 6 and the center disc 5 are shown and these parts are to be removed to form the completed seal. In addition, the bead portion 7 must be cut off.

A cross-sectional view of the finished form of the bearing seal can be seen in FIG. 5 and the resilient portion is shown at 8 with the horizontal flange portion 3 of the metallic insert member embedded therein with the end part 9 of the metallic loop also forming a reinforcing ring.

It has been found difficult to remove the central portion 5 of the molding and the peripheral edge portion 6 in a manner to assure complete uniformity of all bearing seals. Additionally, it can be appreciated that the removal of the bead portion 7 presents problems in that both metal and rubber are being removed at this point. With ordinary cutting procedures the surface 10 of the bearing has been formed with burrs adjacent the face portions of metallic portions 3 and 9.

According to the present invention these disadvantages are overcome through the use of the hereinafter described process and apparatus. Referring to FIG. 7 there is shown a plate 11 which has a circular groove 12 formed in the upper surface thereof. This groove 12 is adapted to receive the bead portion 7 of the molding 4. Mounted so as to cooperate with this plate is a ring-shaped clamping plate 13 which is spring pressed by means of springs 14 to an outer position wherein an inwardly extending shoulder 15 engages a cooperating shoulder on an inner cutter 16. This inner cutter 16 is circular or ring-shaped and concentrically mounted therewith is an outer cutter 17. The inner and outer cutters are rigidly connected together by means of a bolt 18 and the spacing between the inner and outer cutters is sufficient to receive the clamping member 13. Both of the cutters are provided with sharpened lower edges around the entire peripheries thereof and means (not shown) may be provided to rotate the entire cutter assembly. The device operates in the following manner. The molding 4 with the center portion 5 and edge portion 6 which are to be removed is placed in the die block or plate 11 with the bead portion 7 engaging in groove 12. It can be seen that this groove provides a convenient means for accurately locating the molding with respect to the die block. The clamping plate 13 and the inner and outer cutters 16 and 17 are brought downwardly until the clamping plate firmly engages that portion of the molding 4 which is to form the final bearing seal. The inner and outer cutters are rotated around the stationary clamping plate 13 and the sharpened edges cut away the excess material from the edge portion 6 and remove the central portion 5. An air blast applied through bore 19 will serve to remove the bearing seal from the lower plate 11. The apparatus provides a most effective means for removing the excess resilient material from the bearing seal and it can be seen that the locating means comprising the bead on the molding and the circular groove greatly expedites the trimming operation.

Figure 9:
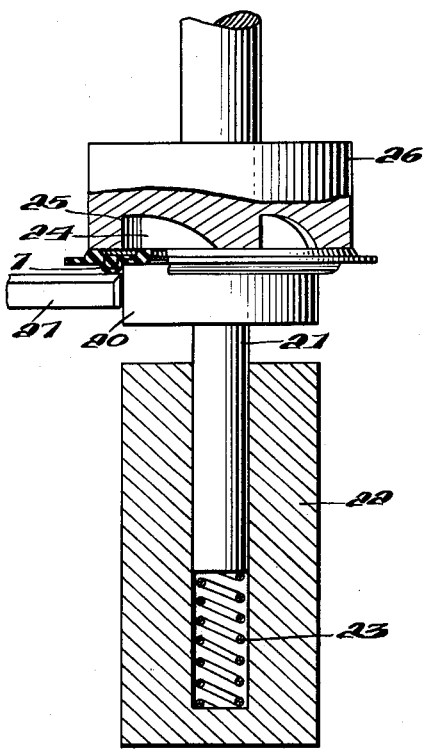
FIG. 9 is a vertical sectional view of a machine for trimming the metallic reinforcement member from the bearing seal shown in FIG. 2.

Following this step it is necessary to remove the bead portion 7 to form the finished seal having a cross-section such as shown in FIG. 5. For this latter operation the bearing seal is placed in the apparatus shown in FIG. 9 by placing it on an elevator forming the lower plate 20. The bead 7 overhangs the periphery of circular plate 20 and as can be seen in FIG. 9 this plate has a downwardly extending shaft 21 rigidly connected therewith, which shaft is adapted to move freely within a bore in a housing 22. Spring means 23 provides a resilient base for the elevator which will tend to maintain it in the upper position thereof.

The upper surface of the elevator 20 is provided with a plurality of dogs or bosses which extend upwardly from the plate and are spaced inwardly of the periphery so as to fit within the central aperture in the bearing seal. These dogs cooperate with recesses 25 in an upper clamping plate 26. This upper clamping plate is adapted to be brought into engagement with the lower elevator plate so that the dogs 24 engage the recesses 25 and the bearing seal is rigidly clamped between plates 21 and 26. Any suitable means may be utilized for rotating the entire assembly and for gradually lowering the plates with the bearing seal rigidly clamped therebetween until the bead portion 7 engages a cutting tool 27. The cutting tool will remove the bead portion 7 as the assembly is lowered and near the end of the removal operation the cutting tool is reciprocated in a horizontal direction so as to smooth the surface of the bearing seal and to prevent the formation of any burrs on the metallic edge portions of the portions 3 and 9 of the insert.

Referring now to FIG. 6 there is shown another form of a molding 28 for a bearing seal in which the metallic insert constitutes a flat disc or ring with no loop such as shown in the FIG. 1 form of reinforcement. However, with the molding shown in FIG. 2 the bead provided a convenient means of positioning the molding within the trimming machine and, thus, in connection with the molding shown in FIG. 6 a separate means must be provided to enable the operator to position the molding within the trimming machine. It can be seen that the molding 28, FIG. 6, is provided with a central bossed ring portion 29. This embossment may take any desired form and need not necessarily be shaped as a ring as shown.

Figure 8:
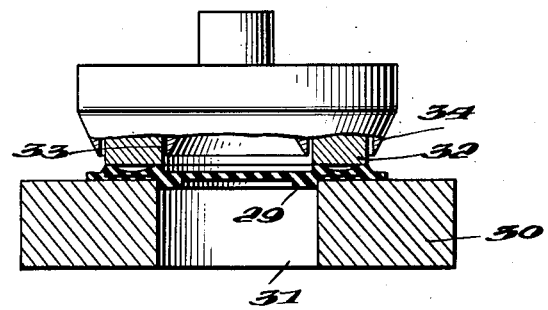
FIG. 8 is a vertical sectional view of a machine for trimming the bearing seal shown in FIG. 6.

The molding 28 with the central embossment 29 is placed on a die plate 30, FIG. 8, having a central aperture 31. This center aperture 31 receives the embossment on the molding to provide locating means so that the molding will be clamped and trimmed accurately by the clamp 32 and inner and outer cutters 33 and 34 respectively which are similar to the clamp and cutters described with reference to FIG. 7. Thus, it can be seen that the embossment provided on the molding insures the correct positioning of the molding during the cutting operation. Since there is no bead provided in this type of molding, there is no need for a surface cutting apparatus such as shown in FIG. 9.

It can be appreciated that according to the present invention there is provided a method and apparatus for trimming the excess material from the rough moldings to form the finished bearing seal. Means is provided to accurately locate the molding within the trimming machine so that the trimming operation can be performed rapidly and accurately. In connection with that form of bearing seal shown in FIGS. 1 to 3 a method and apparatus is provided for removing the loop portion of the metallic insert without the formation of burrs. In this latter method, the reciprocation of the cutting tool at the conclusion of the loop removal step is an essential.

Obviously, many modifications and variations of the present invention are possible in the light of the above teachings. What is claimed as new and desired to be secured by Letters Patent is:

A method for trimming a portion of a reinforcing member from a bearing seal comprising the steps of clamping the bearing seal between a pair of jaws with the portion of the reinforcing member to be trimmed disposed outwardly of the periphery of the jaws, rotating the pair of jaws with the bearing seal clamped therebetween, moving the pair of jaws with the bearing seal clamped therebetween along the axis of rotation of the jaws to engage a cutter head with the portion of the reinforcing member to be trimmed, and reciprocating the cutter head toward and away from the center of the bearing seal while maintaining the cutter in engagement with the portion of the reinforcing member to be trimmed to remove burrs from the edge of the reinforcing member.

References Cited in the file of this patent

UNITED STATES PATENTS

| | | |
|---|---|---|
| 419,755 | Duff | Jan. 21, 1890 |
| 535,121 | Sanford | Mar. 5, 1895 |
| 593,533 | Campbell | Nov. 9, 1897 |
| 923,585 | Schacht | June 1, 1909 |
| 939,144 | Tysaght | Nov. 2, 1909 |
| 954,955 | Grossman | Apr. 12, 1910 |
| 1,270,038 | Malm | June 18, 1918 |
| 1,518,521 | Kraft | Dec. 9, 1924 |
| 1,984,919 | Davis | Dec. 18, 1934 |
| 2,249,141 | Johnson | July 15, 1941 |
| 2,676,041 | Englesson | Apr. 20, 1954 |
| 2,702,597 | Wickwire et al. | Feb. 22, 1955 |
| 2,753,199 | Victor | July 3, 1956 |

FOREIGN PATENTS

| | | |
|---|---|---|
| 329,293 | Italy | Sept. 4, 1935 |